United States Patent
Hahm et al.

(10) Patent No.: US 9,241,369 B2
(45) Date of Patent: Jan. 19, 2016

(54) METHOD AND APPARATUS FOR ESTABLISHING WIRELESS LOCAL AREA NETWORK LINK BETWEEN PORTABLE TERMINALS

(71) Applicant: SAMSUNG ELECTRONICS CO., LTD., Suwon-si (KR)

(72) Inventors: Seong-il Hahm, Yongin-si (KR); Hyeong-seok Kim, Seoul (KR); Jae-hoon Jung, Suwon-si (KR); Young-ri Kim, Suwon-si (KR); Jae-hwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 173 days.

(21) Appl. No.: 13/740,414

(22) Filed: Jan. 14, 2013

(65) Prior Publication Data
US 2013/0182695 A1    Jul. 18, 2013

(30) Foreign Application Priority Data

Jan. 18, 2012   (KR) .................. 10-2012-0005836

(51) Int. Cl.
*H04W 84/12*   (2009.01)
*H04W 76/02*   (2009.01)
*H04W 88/06*   (2009.01)

(52) U.S. Cl.
CPC ............ *H04W 84/12* (2013.01); *H04W 76/023* (2013.01); *H04W 88/06* (2013.01)

(58) Field of Classification Search
None
See application file for complete search history.

(56) References Cited

U.S. PATENT DOCUMENTS

| 8,750,201 | B2 * | 6/2014 | Zhu et al. ................ 370/328 |
| 2005/0026569 | A1 | 2/2005 | Lim et al. |
| 2008/0181187 | A1 * | 7/2008 | Scott et al. ............... 370/338 |
| 2009/0111378 | A1 | 4/2009 | Sheynman et al. |
| 2009/0323659 | A1 | 12/2009 | Zhang |
| 2011/0228699 | A1 * | 9/2011 | Shin et al. ............... 370/254 |

(Continued)

FOREIGN PATENT DOCUMENTS

| EP | 2230876 A1 | 9/2010 |
| JP | 2011-199342 A | 10/2011 |
| KR | 1020110023519 A | 3/2011 |

(Continued)

OTHER PUBLICATIONS

International Search Report for PCT/KR2013/000273 dated May 1, 2013 [PCT/ISA/220 & 210].

(Continued)

*Primary Examiner* — Kerri Rose
(74) *Attorney, Agent, or Firm* — Sughrue Mion, PLLC

(57) ABSTRACT

A method of connecting a plurality of portable terminal over a wireless local area network (WLAN), the method including: a user selecting at least one contact from a contact list displayed on a screen of a first portable terminal, transmitting, from the first portable terminal to an external server over a cellular network, connection information necessary for establishing a WLAN link to the first portable terminal; pushing the connection information from the external server to a second portable terminal corresponding to the selected contact; a user pressing a connection authentication button on a selection menu displayed on the second portable terminal, and establishing the WLAN link to the first portable terminal from the second portable terminal by using the connection information.

27 Claims, 18 Drawing Sheets

(56) References Cited

U.S. PATENT DOCUMENTS

2011/0252144 A1 10/2011 Tung et al.
2011/0281556 A1 11/2011 Choi et al.

FOREIGN PATENT DOCUMENTS

| KR | 10-2011-0037680 A | 4/2011 |
|---|---|---|
| WO | 2008/119150 A1 | 10/2008 |
| WO | 2013095382 A1 | 6/2013 |

OTHER PUBLICATIONS

Written Opinion for PCT/KR2013/000273 dated May 1, 2013 [PCT/ISA/237].

Communication dated Sep. 4, 2015 issued by European Patent Office in counterpart European Patent Application No. 13739020.9.

* cited by examiner

METHOD AND APPARATUS FOR ESTABLISHING WIRELESS LOCAL AREA NETWORK LINK BETWEEN PORTABLE TERMINALS

CROSS-REFERENCE TO RELATED PATENT APPLICATION

This application claims priority from Korean Patent Application No. 10-2012-0005836, filed on Jan. 18, 2012, in the Korean Intellectual Property Office, the disclosure of which is incorporated herein in its entirety by reference.

BACKGROUND

1. Field

Methods and apparatuses consistent with exemplary embodiments relate to a method and apparatus for establishing a wireless local area network (WLAN) link in such a way that portable terminals can communicate with each other over a WLAN.

2. Description of the Related Art

An IEEE 802.11 wireless local area network (WLAN) technology has been developed. WLAN users tend to increase by geometric progression. A variety of encryption and authentication methods are used to achieve security in WLAN communications.

Wi-Fi Alliance (WFA) has proposed a Wi-Fi protected setup (WPS) so as to improve limitations of usability. WPS constitutes a personal identification number (PIN) method and a push button configuration (PBC) method. The PIN method is mandatory.

According to the WPS PIN method, users simply enter 4-8 digit PIN numbers to set a security connection without having to select a security method. Nevertheless, users need to use a complicated setting menu to generate or enter PIN numbers in the WPS PIN method.

According to the WPS PBC method, if a PBC button is implemented in a software way, users also need to search for and press the PBC button through a complicated setting menu. Even if the PBC button is implemented in a hardware way, a device is likely to malfunction due to users' confusion of the PBC button with another button (for example, a reset button). Furthermore, if several devices are connected to each other over a WLAN, users need to set all respective devices, which is a very cumbersome and time-consuming process.

SUMMARY

One or more exemplary embodiments may provide a method and apparatus for setting a wireless local area network (WLAN) link quickly and conveniently in order to connect a plurality of portable terminals to each other over a WLAN.

According to an aspect of an exemplary embodiment, there is provided a method of a first portable terminal to communicate with a second portable terminal, the method including: displaying a contact list on a screen of the first portable terminal; receiving a user input that selects at least one contact from the displayed contact list; transmitting connection information necessary for establishing a wireless local area network (WLAN) link to the first portable terminal to the second portable terminal over a mobile communication network; receiving a WLAN connection request through a WLAN interface from the second portable terminal that receives the connection information; and establishing the WLAN link to the second portable terminal in response to the request.

The connection information may include a service set identifier (SSID) of the WLAN, a channel number, and a security key.

The method may further include: determining mode information corresponding to one of an ad hoc mode and an infrastructure mode, wherein the connection information includes the determined mode information.

The establishing of the WLAN link may include: establishing the WLAN link according to the mode information; and wherein, if the mode information is the infrastructure mode, the first portable terminal serves as an access point (AP), and the second portable terminal serves as a non-AP station.

The method may further include: executing an application that displays the contact list, wherein an identifier of an application corresponding to the executed application is included in the connection information.

The identifier of the application may correspond to an application of the second portable terminal capable of executing contents transmitted by the first portable terminal.

The method may further include: transmitting contents from the first portable terminal to the second portable terminal by using the established WLAN link.

The transmitting of the connection information may include: transferring the connection information to the second portable terminal over an external server according to a push mechanism.

According to an aspect of another exemplary embodiment, there is provided a method of a second portable terminal to communicate with a first portable terminal, the method including: receiving connection information necessary for communicating with the first portable terminal over a WLAN from an external server over a mobile communication network in a push mechanism; displaying a selection menu for establishing a WLAN link to the first portable terminal on a screen of the second portable terminal; receiving an input that requests a connection to the first portable terminal through the displayed selection menu; and establishing the WLAN link to the first portable terminal through a WLAN interface by using the connection information in response to the input.

The connection information may include an SSID of the WLAN, a channel number, and a security key.

The connection information may include mode information corresponding to one of an ad hoc mode and an infrastructure mode, wherein the establishing of the WLAN link is performed based on the mode information.

If the mode information is the infrastructure mode, the first portable terminal serves as an AP, and the second portable terminal serves as a non-AP station.

The method may further include: executing an application corresponding to an identifier of an application included in the connection information.

The establishing of the WLAN link may include: if a WLAN function of the second portable terminal is idle, activating the WLAN function.

According to an aspect of another exemplary embodiment, there is provided a computer readable recording medium having recorded thereon a program for executing the method of method of a first portable terminal to communicate with a second portable terminal.

According to an aspect of another exemplary embodiment, there is provided a portable terminal device including: a memory for storing at least one program; and a processor for executing the at least one program in such a way that a first portable terminal and a second portable terminal establish a WLAN link therebetween, wherein the at least one program includes instructions for: displaying a contact list on a screen of the first portable terminal; receiving a user input that selects at least one contact from the displayed contact list; transmitting connection information necessary for establishing a wireless local area network (WLAN) link to the first portable terminal to the second portable terminal over a mobile communication network; receiving a WLAN connection request through a WLAN interface from the second portable terminal that receives the connection information; and establishing the WLAN link to the second portable terminal in response to the request.

The connection information may include an SSID of the WLAN, a channel number, and a security key.

The at least one program may further include: instructions for determining mode information corresponding to one of an ad hoc mode and an infrastructure mode, wherein the connection information includes the determined mode information.

The establishing of the WLAN link may include: establishing the WLAN link according to the mode information; and wherein, if the mode information is the infrastructure mode, the first portable terminal serves as an AP, and the second portable terminal serves as a non-AP station.

The at least one program may further include: instructions for executing an application that displays the contact list, wherein an identifier of an application corresponding to the executed application is included in the connection information.

The identifier of the application may correspond to an application of the second portable terminal capable of executing contents transmitted by the first portable terminal.

According to an aspect of another exemplary embodiment, there is provided a portable terminal device including: a memory for storing at least one program; and a processor for executing the at least one program in such a way that a first portable terminal and a second portable terminal establish a WLAN link therebetween, wherein the at least one program includes instructions for: receiving connection information necessary for communicating with the first portable terminal over a WLAN from an external server over a mobile communication network in a push mechanism; displaying a selection menu for establishing a WLAN link to the first portable terminal on a screen of the second portable terminal; receiving an input that requests a connection to the first portable terminal through the displayed selection menu; and establishing the WLAN link to the first portable terminal through a WLAN interface by using the connection information in response to the input.

The connection information may include mode information corresponding to one of an ad hoc mode and an infrastructure mode, wherein the establishing of the WLAN link is performed based on the mode information.

If the mode information is the infrastructure mode, the first portable terminal serves as an AP, and the second portable terminal serves as a non-AP station.

The at least one program may further include: instructions for executing an application corresponding to an identifier of an application included in the connection information.

The at least one program may further include: instructions for, if a WLAN function of the second portable terminal is idle, activating the WLAN function.

According to an aspect of another exemplary embodiment, there is provided a method of a server to communicate with a plurality of portable terminals over a mobile communication network, the method including: transmitting contact information registered in connection with the first portable terminal to a first portable terminal; receiving at least one contact selected from the contact information and connection information necessary for establishing a WLAN link to the first portable terminal from the first portable terminal; and transmitting the connection information to a second portable terminal corresponding to the selected at least one contact according to a push mechanism.

BRIEF DESCRIPTION OF THE DRAWINGS

The above and other exemplary aspects and advantages of will become more apparent by describing in detail exemplary embodiments with reference to the attached drawings in which.

DETAILED DESCRIPTION OF THE INVENTION will now be described more fully with reference to the accompanying drawings, in which exemplary embodiments are shown. Expressions such as "at least one of," when preceding a list of elements, modify the entire list of elements and do not modify the individual elements of the list.

A portable terminal means a portable communication device including both a communication interface for a cellular network, i.e., a mobile communication network, and an interface for a wireless local area network (WLAN), and is a term including all of a cellular phone, a smart phone, a tablet, etc.

Figure 1:
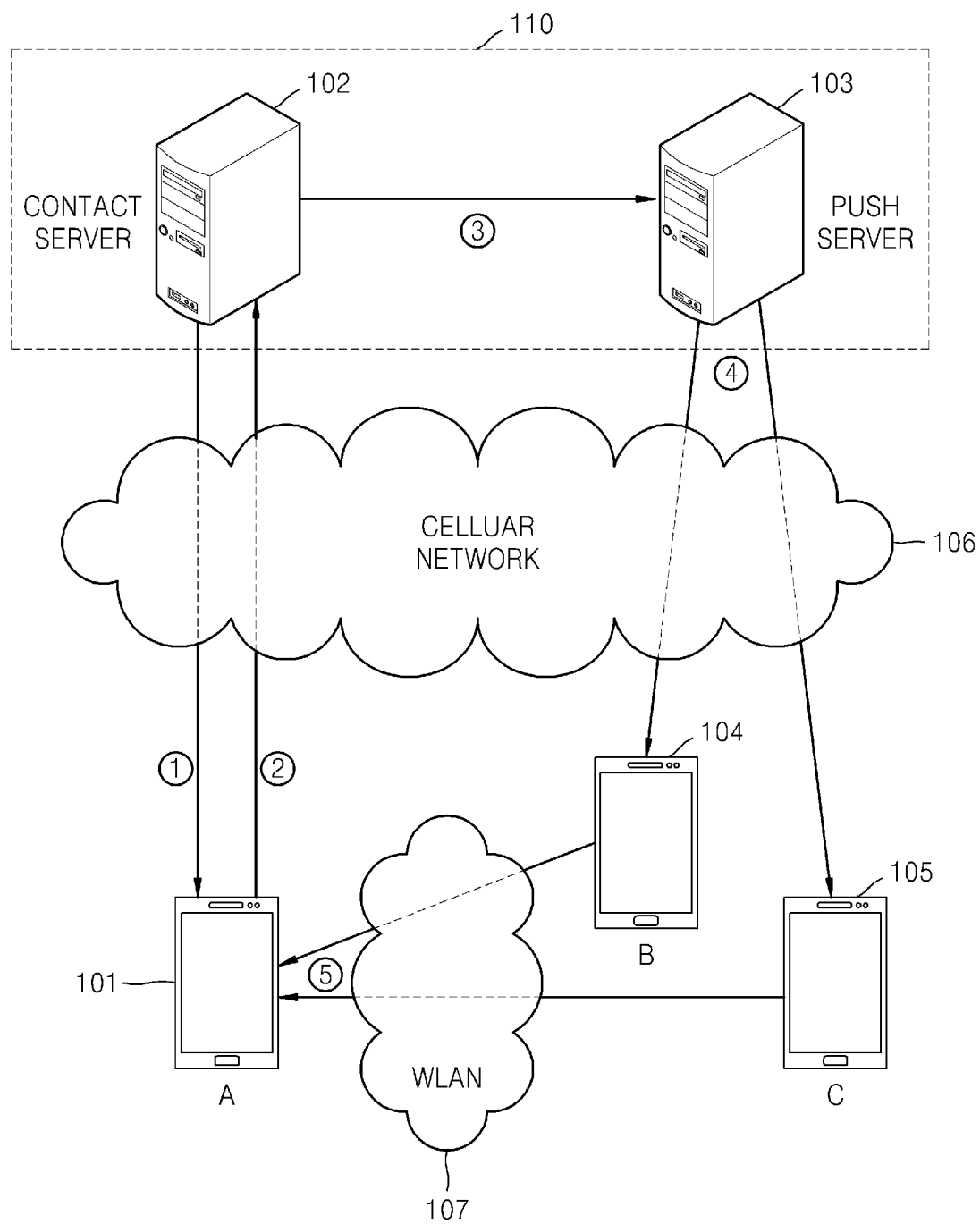
FIG. 1 is a conceptual diagram for describing a process of establishing a wireless local area network (WLAN) link, according to an exemplary embodiment.

FIG. 1 is a conceptual diagram for describing a process of establishing a WLAN link, according to an embodiment of.

Referring to FIG. 1, a process of establishing WLAN links between a portable terminal A 101 and portable terminals B 104 and C 105 is described in the present embodiment. Establishing a WLAN link between two portable terminals means connecting two portable terminals over a WLAN 107 so that two portable terminals can communicate with each other. In a case where the WLAN 107 is an infrastructure-based network, the portable terminal A 101 operates as an access point (AP), and the portable terminals B 104 and C 105 operate as non-AP stations. Although two non-AP stations are shown in FIG. 1, it would be obvious to those of ordinary skill in the art that one non-AP station or three or more non-AP stations may be used.

A user executes an application (hereinafter referred to as "connection application") in the portable terminal A 101 for establishing WLAN links. Then, the connection application receives contact information from a contact server 102 over a cellular network 106 (①). In this regard, the contact information may include identifiers of persons registered on the contact server 102 by the user of the portable terminal A 101 through the connection application, and may be implemented in various ways like telephone numbers, names, IDs, etc.

The connection application may be an application dedicated to performing the process of establishing WLAN links according to the present embodiment, or may be an application for providing various other services. For example, the connection application may be an application for providing users with a mobile messenger service, a social network service (SNS), a service for reproducing multimedia content, etc.

In this regard, the cellular network 106 may use a variety of types of networks such as 2 G/3 G/4 G networks, wideband code division multiple access (WCDMA), global system for mobile communications (GSM), etc., but the present embodiment is not limited to these specific networks.

The portable terminal A 101 that receives the contact information displays a contact list on a screen thereof. In a case where the user selects a contact corresponding to the portable terminals B 104 and C 105 from the contact list, the portable terminal A 101 transmits connection information to the contact server 102 over the cellular network 106 so as to establish WLAN links to the portable terminals B 104 and C 105 (②).

In this regard, the contact information may include information necessary for establish a WLAN link to the portable terminal A 101, and may include, for example, a service set identifier (SSID) of the WLAN 107, a channel number, a security key, other security information, etc. The WLAN link may include an ad hoc mode and an infrastructure mode. The portable terminal A 101 may display a selection menu for selecting one of the ad hoc mode and the infrastructure mode on the screen thereof. The user may select one of the ad hoc mode and the infrastructure mode through the selection menu.

A connection mode of the WLAN 107 may be automatically selected according to a type of an application. For example, in a case where the application streams music from the portable terminal A 101 to the portable terminals B 104 and C 105, the infrastructure mode may be selected. In a case where the portable terminals A 101, B 104, and C 105 transmit their respective camera views (for example, showing a captured screen) to one another, the ad hoc mode may be selected. Such a selection of the ad hoc mode or the infrastructure mode according to the type of the application may be set by the user. The ad hoc mode or the infrastructure mode may be selected according to the number of portable terminals connectable to the portable terminal A. For example, in a case where the portable terminal A 101 requests connections to a plurality of portable terminals, the infrastructure mode may be selected. In a case where the portable terminal A 101 requests connections to one portable terminal, the ad hoc mode may be selected. Such a selection of the ad hoc mode or the infrastructure mode with respect to the portable terminal A 101 may be set in various ways.

The user selects the infrastructure mode. Then, the portable terminal A 101 performs an AP function. In this case, the connection information may include mode information indicating whether WLAN links are established in the infrastructure mode. The connection information will be described in more detail with reference to FIG. 2.

The user of the portable terminal A 101 may execute a specific application in the portable terminals B 104 and C 105 in addition to merely establishing WLAN links.

For example, in a case where the connection application that is being currently executed in the portable terminal A 101 is an application for providing a chatting service, the user of the portable terminal A 101 may execute the same application as that executed in the portable terminal A 101 in the portable terminal B 104 to enjoy the chatting service with a user of the portable terminal B 104 over the WLAN 107. Alternatively, the user of the portable terminal A 101 may execute a music reproduction application of the portable terminal C 105 to allow the portable terminal C 105 to reproduce streaming a music file stored in the portable terminal A 101 over the WLAN 107. In this case, the connection information may include an identifier indicating the specific application. The identifier may be mapped to the same application by the portable terminals A 101, B 104, and C 105, and is generated by the portable terminal A 101 or is extracted from the corresponding application.

The contact server 102 transfers the connection information to a push server 103, and requests the push server 103 to transmit the connection information to the portable terminals B 104 and C 105 in a push mechanism (③).

The push server 103 that receives the connection information from the contact server 102 pushes the connection information to the portable terminals B 104 and C 105 over the cellular network 106 (④). Although the contact server 102 and the push server 103 are separately shown in FIG. 1, the contact server 102 and the push server 103 may be implemented as a single server 110.

The portable terminals B 104 and C 105 receive push messages including the connection information and display selection menus asking whether to establish WLAN links to the portable terminal A 101, i.e., whether to connect the portable terminal A 101 on screens thereof. The users of the portable terminals B 104 and C 105 requests connections to the portable terminal A 101 through the selection menu. Then, the portable terminals B 104 and C 105 request the portable terminal A 101 to establish WLAN links through WLAN interfaces by using the connection information (⑤). If WLAN functions of the portable terminals B 104 and C 105 are idle, the portable terminals B 104 and C 105 receive user inputs to request connections to the portable terminal A 101 through the selection menus and enable WLAN functions thereof.

The portable terminals B 104 and C 105 extract the application identifier from the connection information, search for and execute an application indicated in the application identifier. That is, a portable terminal that supports a function of establishing a WLAN link according to the present embodiment executes a corresponding application if an application identifier is included in connection information. Thus, the portable terminals B 104 and C 105 may receive content from the portable terminal A 101 through the application. For example, in a case where the application identifier is included in the connection information received by the portable terminals B 104 and C 105, the portable terminals B 104 and C 105 may execute a music reproduction application designated by the application identifier to reproduce a music file streamed by the portable terminal A 101.

According to the present embodiment, the user of the portable terminal A 101 may establish WLAN links only by selecting connection contact from a user-friendly contact list without a complicated setting process. In addition, the users of the portable terminals B 104 and C 105 may establish WLAN links only by pressing connection request buttons on selection menus displayed on screens by push messages without a complicated setting process.

Figure 2:
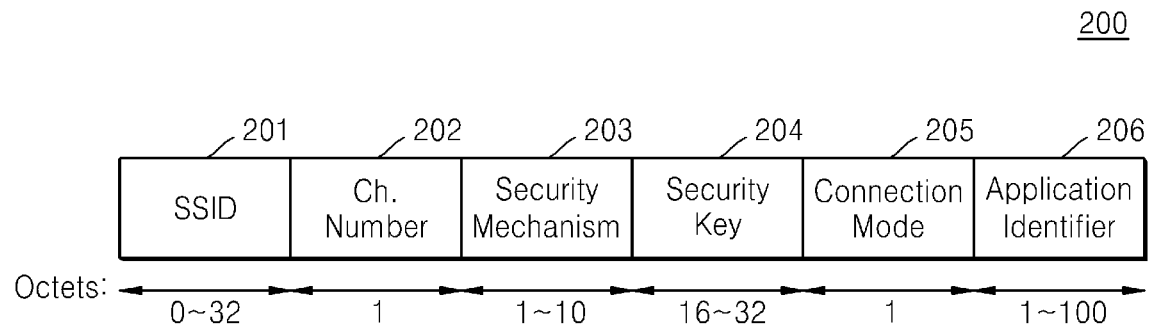
FIG. 2 illustrates a format of connection information, according to an exemplary embodiment.

FIG. 2 illustrates a format of connection information 200, according to an exemplary embodiment of.

Referring to FIG. 2, the connection information 200 according to the present embodiment includes an SSID field 201, a channel number field 202, a security mechanism field 203, a security key field 204, a connection mode field 205, and an application identifier field 206. As described above, the connection information 200 is received by a second portal terminal from a server over a cellular network, and is used to establish a WLAN link between a first portable terminal and the second portable terminal.

The SSID field 201 indicates an SSID of a WLAN to which the first portable terminal belongs.

The channel number field 202 indicates a wireless channel used to establish the WLAN link between the first portable terminal and the second portable terminal in the WLAN to which the first portable terminal belongs, i.e. a WLAN designated by the SSID field 201.

The security mechanism field 203 indicates security mechanism that is to be applied to the WLAN link between the first portable terminal and the second portable terminal. For example, the security mechanism field 203 may designate security mechanism such as wireless equivalent privacy (WEP), Wi-Fi Protected Access (WPA), Wi-Fi Protected Access2 (WPA2), etc., or may designate an open mode that does not use separate security mechanism.

A security key necessary for achieving security in the WLAN link between the first portable terminal and the second portable terminal is written in the security key field 204. The security key is used to perform an authentication procedure on the first portable terminal and the second portable terminal.

Mode information indicating a mode used to establish the WLAN link between the first portable terminal and the second portable terminal is written in the connection mode field 205. As described above, the mode information may include an infrastructure mode or an ad hoc mode.

An application identifier indicating an application that is to be executed in the second portable terminal after the second portable terminal receives the connection information 200 is written in the application identifier field 206. The application identifier field 206 may include meta data of contents that is to be transmitted by the first portable terminal to the second portable terminal through the application, in addition to the application that is to be executed in the second portable terminal. For example, a music title, a singer name, a music reproduction time, etc. of a music file that is to be streamed by the first portable terminal to the second portable terminal may be written in the application identifier field 206. The second portable terminal receives the connection information 200, executes a specific application referring to the application identifier field 206, and performs data communication with the first portable terminal through the application. For example, the second portable terminal may execute a music reproduction application referring to the application identifier field 206 included in the connection information 200, and reproduce music streamed through the WLAN link from the first portable terminal.

Meanwhile, the respective fields of the connection information 200 may be transmitted at different time through separate messages. For example, after the application identifier (and the meta data of contents) are transmitted to the second portable terminal, if a user of the second portable terminal requests a connection through the WLAN link, the remaining information may be transmitted to the second portable terminal. In contrast, the application identifier or the meta data of contents written in the application identifier field 206 may be transmitted to the second portable terminal after the WLAN link is established.

Since the format of the connection information 200 shown in FIG. 2 is an exemplary embodiment, some of the fields 201~206 shown in FIG. 2 may be omitted or new fields may be added according to how to implement. Lengths of the fields 201~206 in an octet unit may be also variable.

Figure 3:
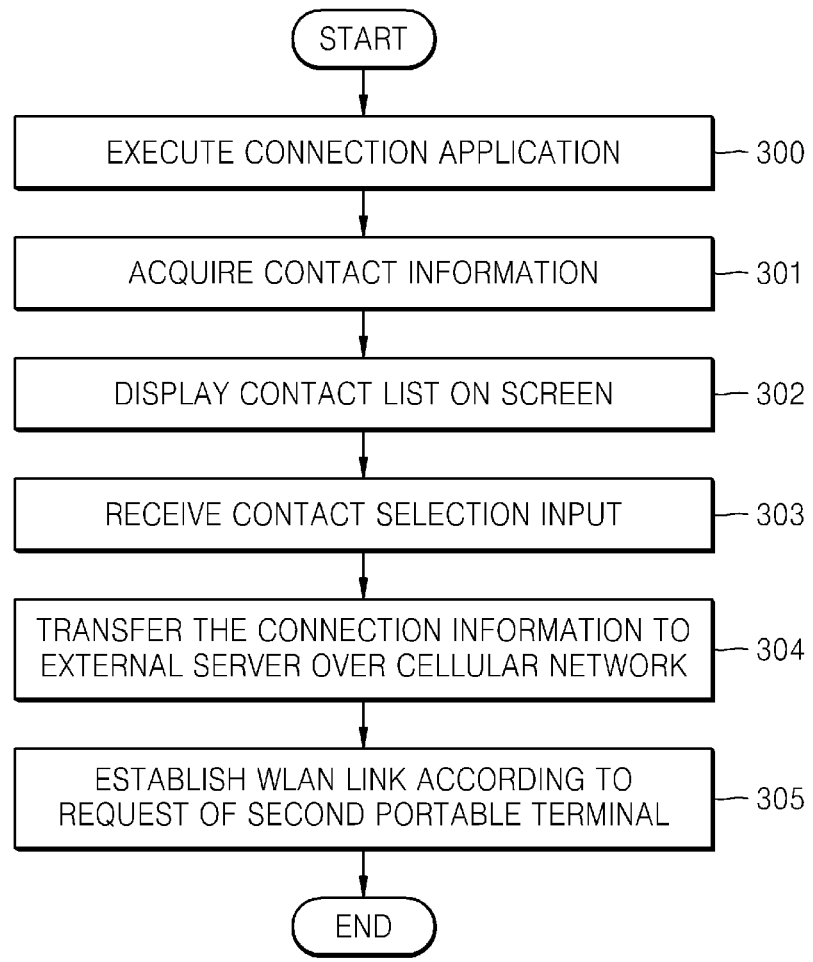
FIG. 3 is a flowchart of a process of operating a first portable terminal, according to an exemplary embodiment.

FIG. 3 is a flowchart of a process of operating a first portable terminal, according to an exemplary embodiment of.

Referring to FIG. 3, the first portable terminal initiates a process of establishing a WLAN link to a second portable terminal according to the present embodiment. That is, the first portable terminal serves as the portable terminal A 101 of FIG. 1, and the second portable terminal serves as at least one of the portable terminals B 104 and C 105 of FIG. 1. That is, the second portable terminal may be the portable terminal B 104 or C 105, or may include both the portable terminals B 104 and C 105.

In operation 300, the first portable terminal executes a connection application according to a user input.

In operation 301, the first portable terminal acquires contact information from an external server over a cellular network as the connection application is executed. In this regard, the external server is used to include both a contact server and a push server.

In operation 302, the first portable terminal displays a contact list on a screen according to the contact information received in operation 301.

In operation 303, a user selects at least one contact of the contact list using input means such as a touch screen, a pointing device like a stylus pen, etc. In the present embodiment, it is assumed that contact corresponding to the second portable terminal is selected, and the first portable terminal receives a user selection input. The first portable terminal may display a menu requesting selection of an infrastructure mode or an ad hoc mode as a WLAN mode that is to be applied to the connection to the second portable terminal on the screen. If the user selects the infrastructure mode, the first portable terminal immediately enables an AP function to serve as an AP. In this case, the second portable terminal is connected to the first portable terminal as a non-AP station.

In operation 304, the first portable terminal transfers connection information to the external server over the cellular network. As described above, the connection information may include an SSID of a WLAN to which the first portable terminal belongs, a channel number, a security key, mode information, an application identifier, etc. The external server pushes the connection information to the second portable terminal. Push mechanism is widely known to one of ordinary skill in the art in a communication field, and thus a detailed description thereof is omitted.

In operation 305, the first portable terminal establishes the WLAN link to the second portable terminal according to a request of the second portable terminal. That is, the second portable terminal requests the first portable terminal to establish the WLAN link through a WLAN interface by using the connection information received from the external server, and the first portable terminal performs authentication on the second portable terminal More specifically, if the WLAN is in the infrastructure mode, the first portable terminal transmits an association response to an association request received from the second portable terminal, and performs authentication through a 4-way handshake process. If the WLAN is in the ad hoc mode, exchange of the association request and response is omitted, and authentication is performed through the 4-way handshake process according to security mechanism of the WLAN. For example, if the security mechanism field 203 of FIG. 2 designates an open mode, the 4-way handshake process is not performed.

The exchange of the association request and response or the 4-way handshake process for establishing a WLAN link is widely known to one of ordinary skill in the art, and thus detailed descriptions thereof are omitted. As described above, since the connection information received by the second portable terminal from the external server may include mode information indicating the WLAN mode, the second portable terminal is informed of a mode used to establish the WLAN link to the first portable terminal.

FIGS. 4A through 4F illustrate a screen of a first portable terminal, according to an exemplary embodiment of. In the present embodiment, the first portable terminal is a terminal that initiates a process of establishing a WLAN link to a second portable terminal. That is, the first portable terminal serves as the portable terminal A 101 of FIG. 1, and the second portable terminal serves as the portable terminal B 104 or C 105 of FIG. 1.

Figure 4A:
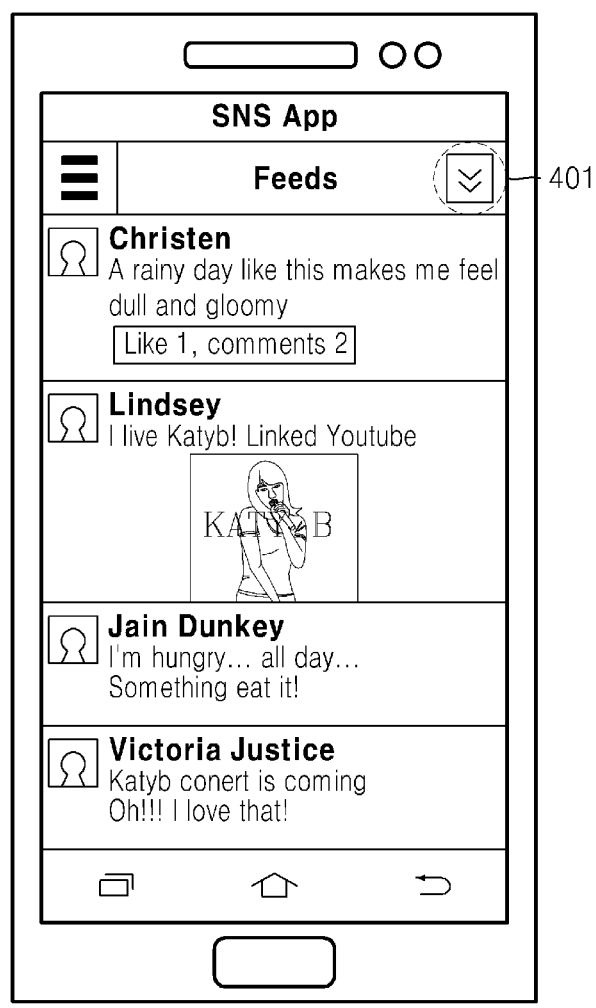
FIGS. 4A through 4F illustrate a screen of a first portable terminal, according to an exemplary embodiment.

Referring to 4A, the screen of the first portable terminal displays a connection application that is executed by a user of the first portable terminal. The connection application is an SNS application. The screen corresponds to operations 300 and 301 of FIG. 3. That is, if the user executes the SNS application, the SNS application receives contact information relating to the user of the first portable terminal from a contact server that provides an SNS server, over a cellular network, and is displayed on the screen of the first portable terminal as shown in FIG. 4A.

Figure 4B:
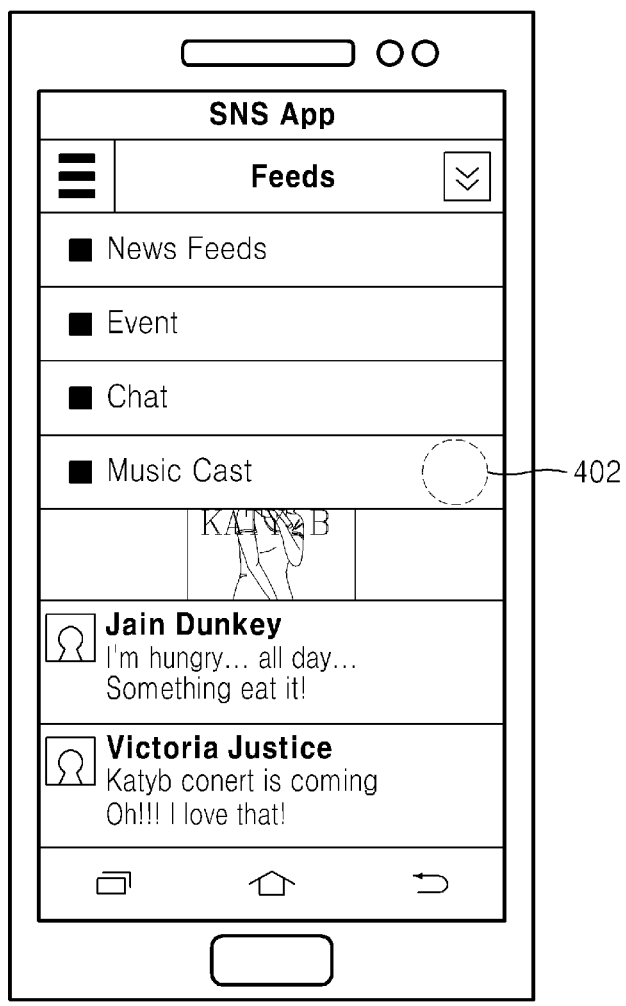

If the user touches a specific button to view services provided by the connection application (401), the screen of the first portable terminal is changed to the screen of FIG. 4B. Referring to FIG. 4B, if the user touches an item <Music Cast> among services provided by the connection application in order to have user's friends listen to music (402), the screen of the first portable terminal is changed to the screen of FIG. 4B.

Figure 4C:
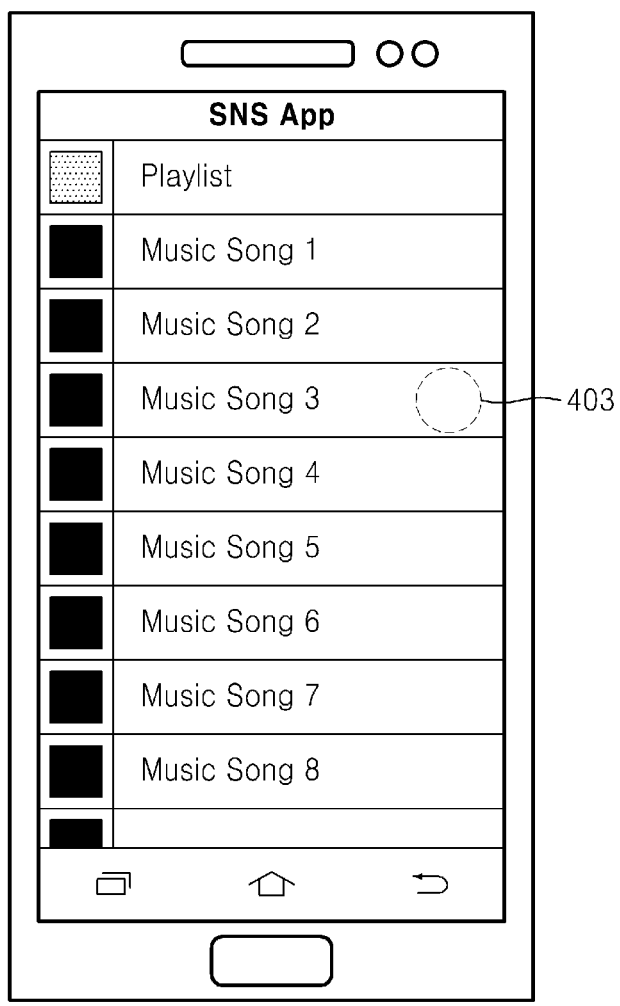

Referring to FIG. 4C, the user touches an item Music Song 3 (403) to determine music that is to be streaming transmitted to friends' portable terminals. The screen of the first portable terminal is changed to the screen of FIG. 4C as the user touch (403).

Figure 4D:
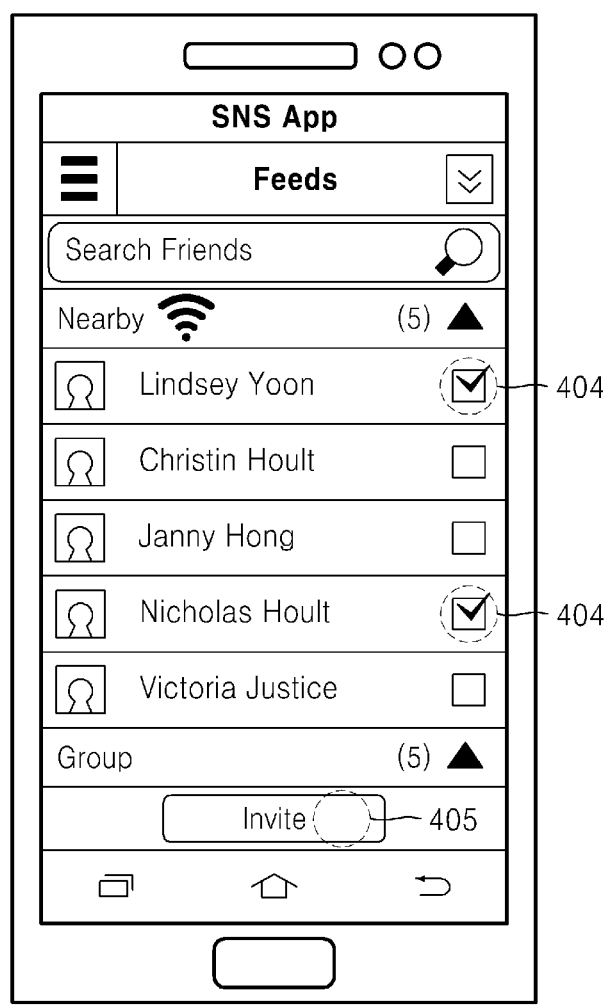

Referring to FIG. 4D, the first portable terminal displays a contact list on the screen. The user touches contact items of Lindsey and Nicholas from the contact list displayed on the screen so as to share the determined music with Lindsey and Nicholas (404), and then touches a button <Invite> to request WLAN connections to Lindsey and Nicholas' portable terminals, i.e. the second portable terminal (405). Thus, the screen of FIG. 4D corresponds to operations 302 and 303. Meanwhile, the screen of the first portable terminal is changed to the screen of FIG. 4E as the user touch (404).

Figure 4E:
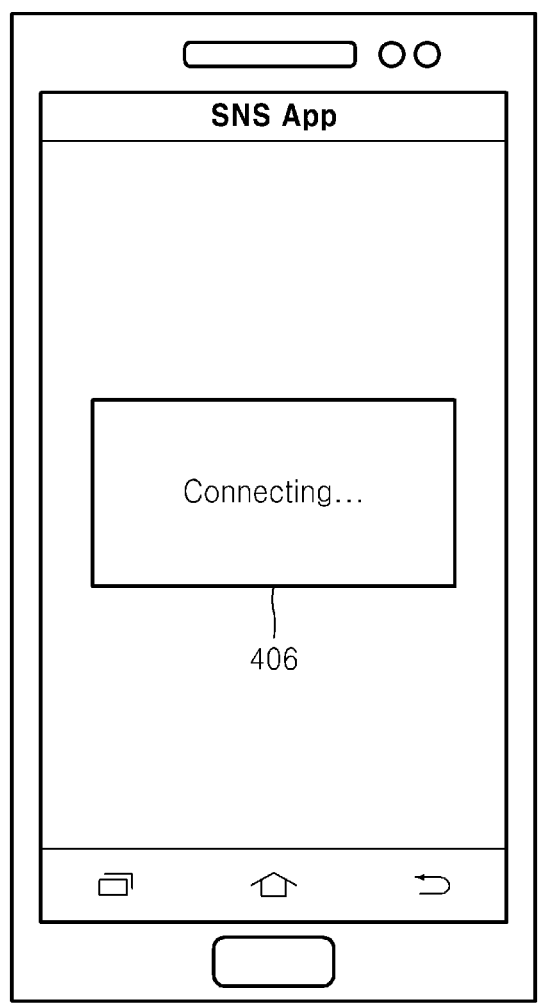

FIG. 4E illustrates the screen of the first portable terminal while the first portable terminal establishes the WLAN link to the second portable terminal. That is, while the first portable terminal performs operations 304 and 305, the screen of the first portable terminal displays a message 406 informing that the first portable terminals is being currently connected to the second portable terminal. If the first portable terminals is completely connected to the second portable terminal over the WLAN, the screen of the first portable terminal is changed to the screen of FIG. 4F. The message 406 may be displayed on a separate screen as shown in FIG. 4E or may overlap with the screen of FIG. 4D.

Figure 4F:
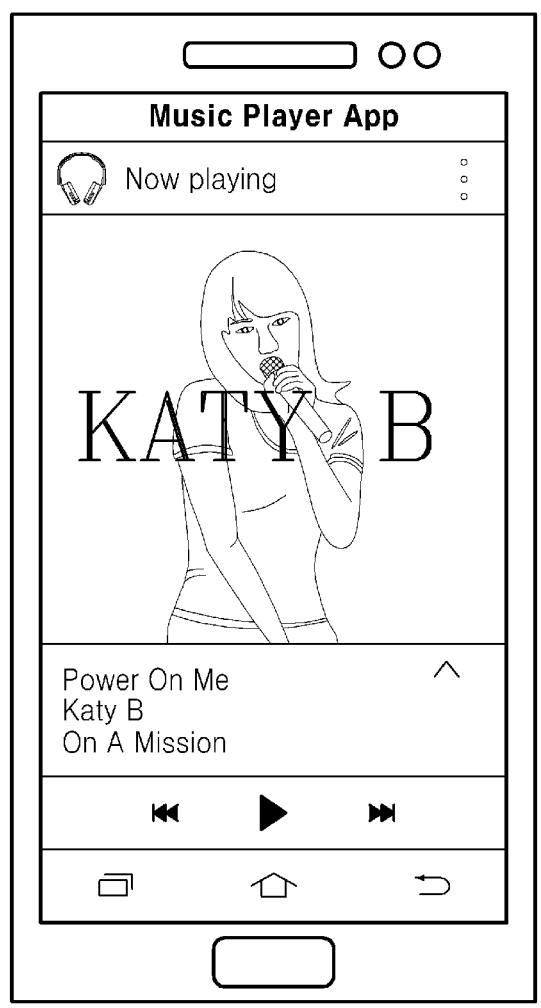

Referring to FIG. 4F, the first portable terminals that is connected to the second portable terminal over the WLAN executes an application to reproduce a music file. The music file application streams the music selected by the user of the first portable terminal to the second portable terminal over the WLAN link. If the WLAN link is established between the first portable terminals and the second portable terminal, the first portable terminals and the second portable terminal no longer use a mobile communication network interface in order to exchange data therebetween. Thus, the first portable terminals and the second portable terminal may deactivate communication functions over a mobile communication network after the WLAN link is established therebetween.

Figure 5:
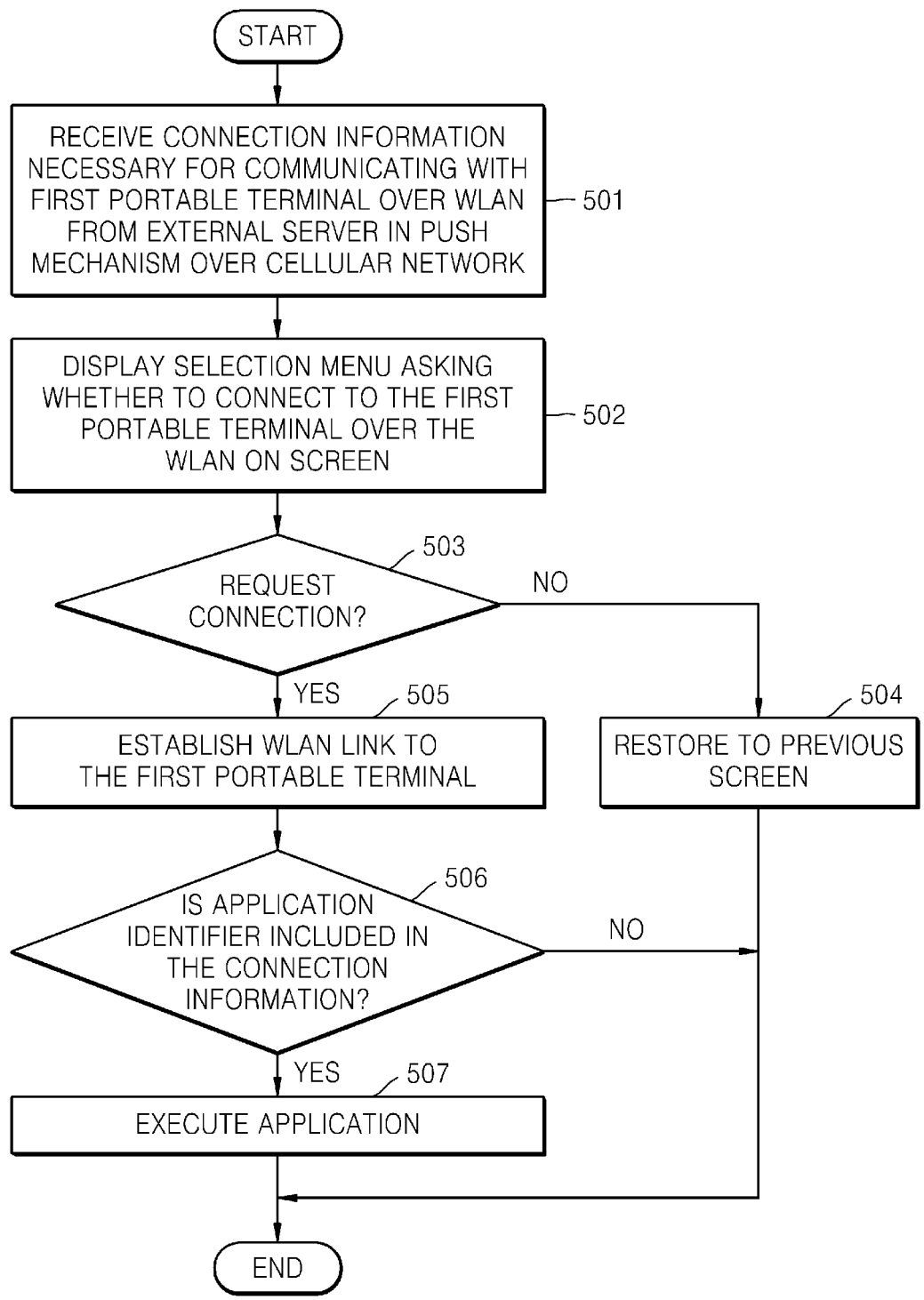
FIG. 5 is a flowchart of a process of operating a second portable terminal, according to an exemplary embodiment.

FIG. 5 is a flowchart of a process of operating a second portable terminal, according to an embodiment of. In the present embodiment, a first portable terminal is a terminal that initiates a process of establishing a WLAN link to the second portable terminal. That is, the first portable terminal serves as the portable terminal A 101 of FIG. 1, and the second portable terminal serves as the portable terminal B 104 or C 105 of FIG. 1.

In operation 501, the second portable terminal receives connection information necessary for communicating with the first portable terminal over a WLAN from an external server over a cellular network in a push mechanism.

In operation 502, the second portable terminal displays a selection menu asking whether to connect the first portable terminal over the WLAN on a screen thereof based on a push message received in operation 501.

In operation 503, the second portable terminal determines if a user connection authentication input is received through the selection menu. If a user connection rejection input is received, the process proceeds to operation 504. If the user connection authentication input is received, the process proceeds to operation 505.

In operation 504, the second portable terminal is restored to a previous screen. For example, before the selection menu is displayed in operation 502, if an image was displayed, the image is displayed, and, if a game was executed, the corresponding game is displayed.

In operation 505, the second portable terminal establishes the WLAN link to the first portable terminal. To establish the WLAN link, the second portable terminal requests a connection to the first portable terminal over the WLAN through a WLAN interface. Thus, if a WLAN function of the second portable terminal is idle, as the user connection authentication input is received in operation 503, the WLAN function of the second portable terminal is automatically enabled. If mode information included in the connection information is an infrastructure mode, the second portable terminal transmits an association request to the first portable terminal. If the mode information is an ad hoc mode, the second portable terminal performs an authentication process, i.e. a 4-way handshake process, by using a security key included in the connection information.

In operation 506, the second portable terminal determines whether the connection information includes an application identifier.

In operation 507, if the connection information received from the external server includes the application identifier, the second portable terminal executes an application designating the application identifier. The second portable terminal may share various services such as game, music streaming, etc. with the first portable terminal by using the application.

Figure 6A:
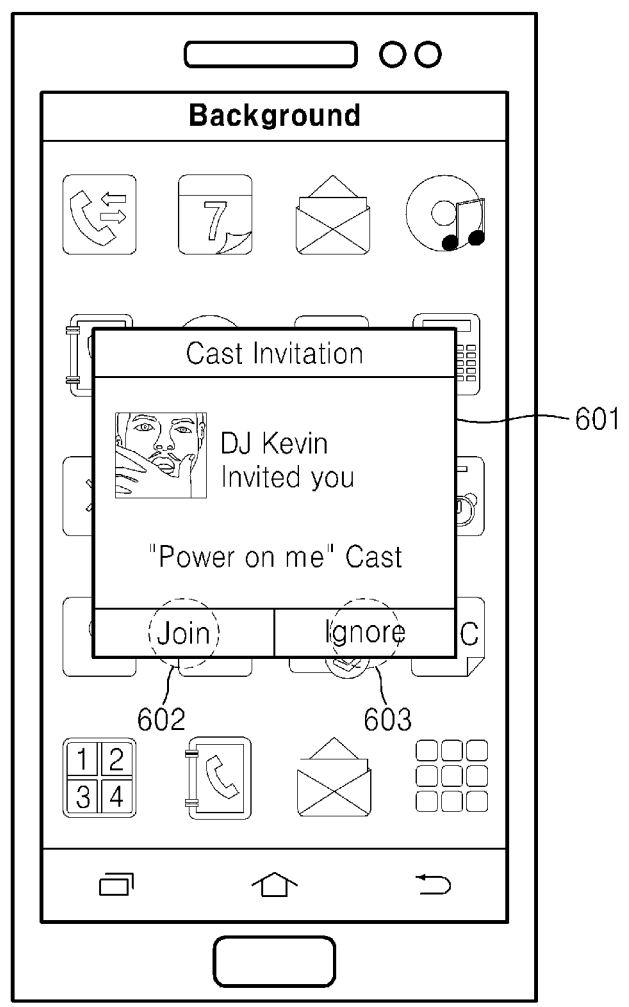
FIGS. 6A through 6C illustrate a screen of a second portable terminal, according to an exemplary embodiment.
Figure 6B:
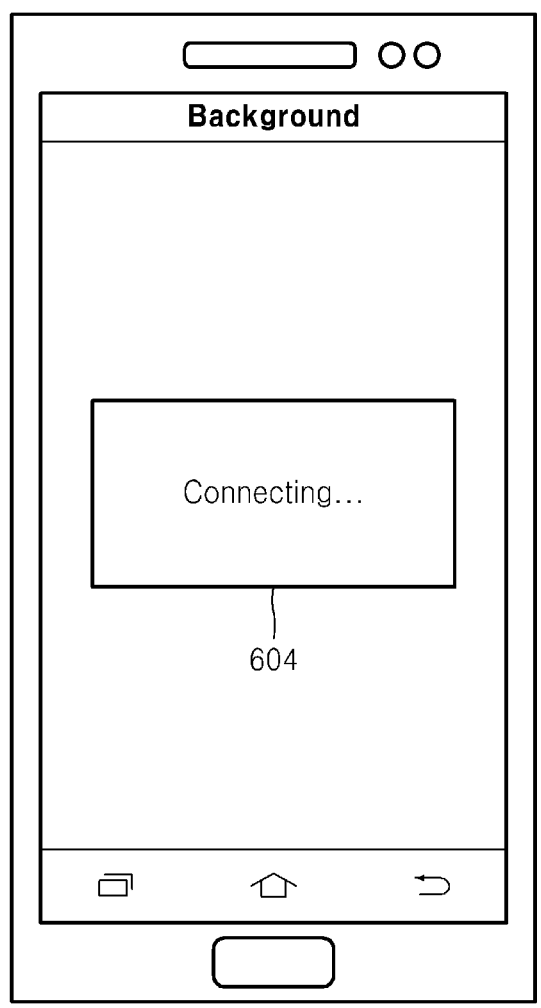
Figure 6C:
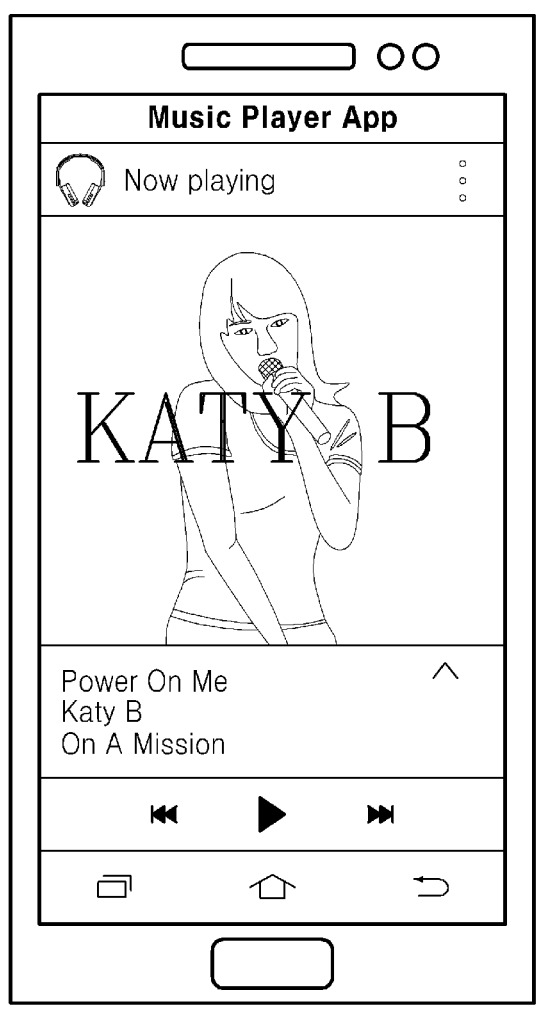

FIGS. 6A through 6C illustrate a screen of a second portable terminal, according to an exemplary embodiment of. In the present embodiment, a first portable terminal is a terminal that initiates a process of establishing a WLAN link to the second portable terminal. That is, the first portable terminal serves as the portable terminal A 101 of FIG. 1, and the second portable terminal serves as the portable terminal B 104 or C 105 of FIG. 1.

FIG. 6A illustrates the screen of the second portable terminal in a case where an external server pushes connection information to the second portable terminal over a cellular network. As shown in FIG. 6A, when the second portable terminal displays a background screen, Kevin who registers a user of the second portable terminal on a contact list is to connect a Kevin's portable terminal, i.e., the first portable terminal, to the second portable terminal in order to stream music.

The external server pushes the connection information to the second portable terminal over the cellular network. The first portable terminal and the second portable terminal register contact of each other through a connection application. Thus, if the connection information is received by the second portable terminal, the second portable terminal may be informed through user information of the first portable terminal that a person who transmits the connection information is Kevin. Also, the second portable terminal may acquire information regarding an application that is to be executed after a WLAN link is established between the second portable terminal and the first portable terminal as well as meta data (for example, a title of music that is to be transmitted by the first portable terminal) of contents that are to be transmitted by the first portable terminal, based on an application identifier included in the connection information.

Therefore, if the second portable terminal receives the connection information, as shown in FIG. 6A, a selection menu 601 including information regarding a person who transmits the connection information, contents information, and items "Join" and "Ignore" for selecting whether to request connection is displayed on a screen. That is, FIG. 6A corresponds to operations 501 and 502 of FIG. 5. The number and types of items displayed on the selection menu 601 may be different according to how to implement.

If a user touches the item <Ignore> on the selection menu 601 displayed on a screen of the second portable terminal shown in FIG. 6A (603), the screen of the second portable terminal is restored to a previous screen, i.e., the background screen. If the user of the second portable terminal touches the item <Join> on the selection menu 601 so as to listen to music streamed by Kevin (602), the screen of the second portable terminal is changed to the screen of FIG. 6B.

FIG. 6B illustrates the screen of the second portable terminal while the second portable terminal establishes the WLAN link to the first portable terminal. As shown in FIG. 6B, while the second portable terminal establishes the WLAN link to the first portable terminal, a status window 604 indicating that the second portable terminal is being connected to the first portable terminal over a WLAN is displayed on the screen of the second portable terminal. That is, FIG. 6B corresponds to operation 505 of FIG. 5. The status window 604 of FIG. 6B may be displayed on the background screen instead of the selection menu 601 of FIG. 6A.

FIG. 6C illustrates the screen of the second portable terminal that displays a music reproduction application executed referring to the application identifier included in the connection information after the second portable terminal is connected to the first portable terminal over the WLAN. The second portable terminal may reproduce a music file streamed by the first portable terminal through the music reproduction application. That is, FIG. 6C corresponds to operation 507 of FIG. 5.

The first portable terminal and the second portable terminal no longer need to use a mobile communication network interface in order to communicate data therebetween if the WLAN link is established therebetween. Thus, the first portable terminals and the second portable terminal may deactivate communication functions over a mobile communication network after the WLAN link is established therebetween.

Figure 7:
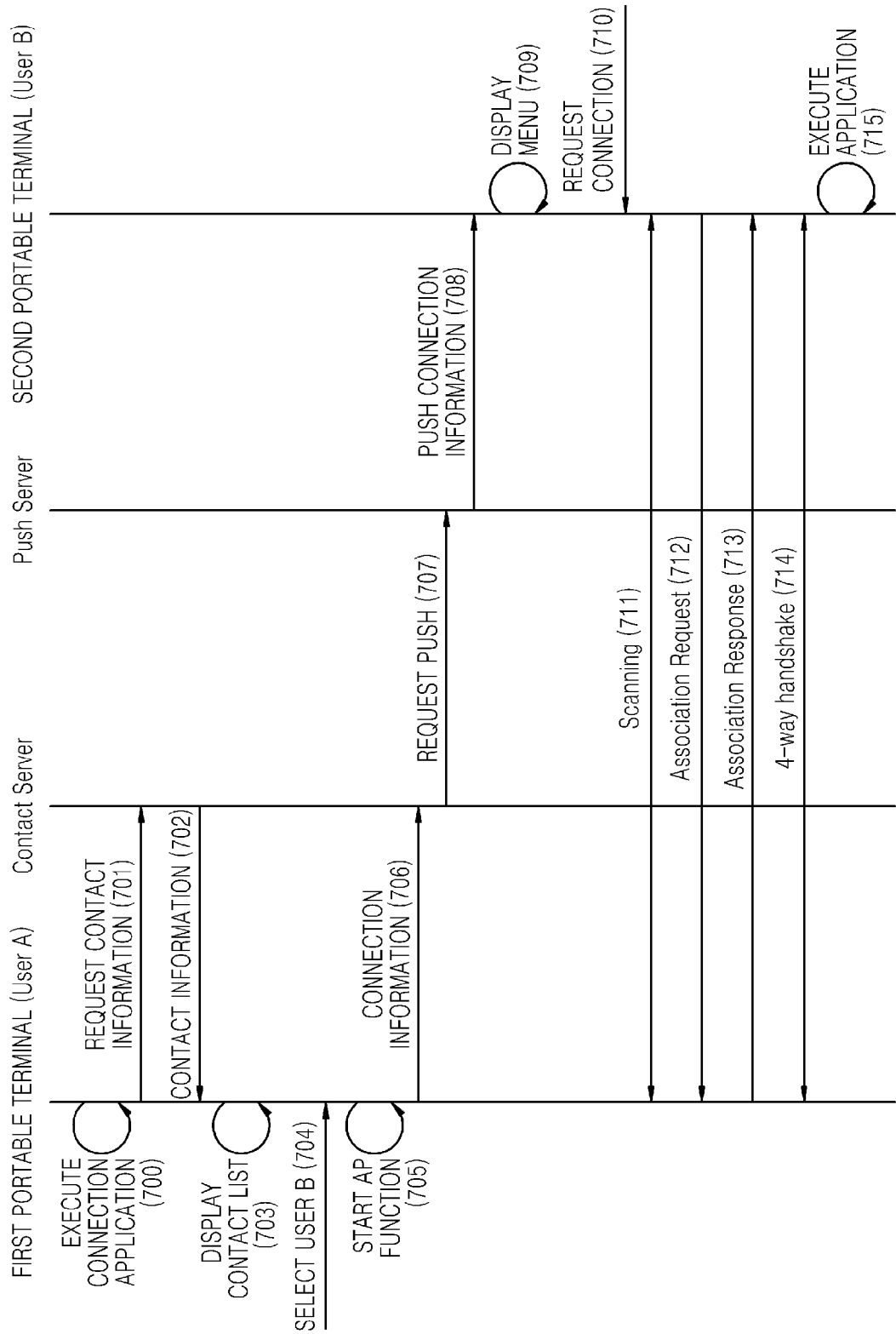
FIG. 7 is a flowchart of a process of establishing a WLAN link between a first portable terminal and a second portable terminal, according to an exemplary embodiment.

FIG. 7 is a flowchart of a process of establishing a WLAN link between a first portable terminal and a second portable terminal, according to an exemplary embodiment of.

Referring to FIG. 7, it is assumed that a user A is currently using the first portable terminal, a user B is currently using the second portable terminal, and the first portable terminal and the second portable terminal operate in an infrastructure mode.

In operation 700, the first portable terminal executes a connection application.

In operation 701, the connection application loaded on the first portable terminal requests contact information related to the first portable terminal from a contact server over a cellular network.

In operation 702, the contact server transmits the contact information to the first portable terminal over the cellular network in response to the request of the first portable terminal.

In operation 703, the first portable terminal displays a contact list on a screen based on the contact information.

In operation 704, a user selects at least one contact from the contact list displayed on the screen of the first portable terminal. Although the user B is assumed to be selected in the present embodiment, a plurality of contact may be simultaneously selected. Although not shown, the user may select a WLAN mode through a user interface of the first portable terminal. An infrastructure mode is assumed to be selected in the present embodiment.

In operation 705, the first portable terminal starts an AP function. More specifically, the first portable terminal periodically broadcasts a beacon frame including an SSID of a WLAN and various parameters. The beacon frame is widely known to one of ordinary skill in the art, and thus a detailed description thereof is omitted.

In operation 706, the first portable terminal transmits connection information to the contact server over the cellular network. The connection information includes information necessary for having access to the WLAN in which the first portable terminal operates as an AP, for example, the SSID, channel information, a security key, etc. The connection information also includes mode information indicating that the WLAN is the infrastructure mode. Although not shown, an identifier of the user B selected by the user A from the contact list is also transferred to the contact server.

In operation 707, the contact server transfers the connection information received from the first portable terminal to a push server and requests the push server to push the connection information to the user B.

In operation 708, the push server transmits the connection information to the second portable terminal of the user B over the cellular network according to a push mechanism. That is, the push server transmits a push message including the connection information to the second portable terminal.

In operation 709, the second portable terminal displays a selection menu asking whether to connect the first portable terminal over the WLAN on the screen as the second portable terminal receives the push message.

In operation 710, the user B inputs a button to request connection through the selection menu.

In operation 711, the first portable terminal and the second portable terminal perform scanning. In this regard, scanning means a process of exchanging frames such as beacons, probe requests, probe responses, etc. in such a way that the first portable terminal and the second portable terminal recognize the existence of each other.

In operation 712, the second portable terminal transmits an association request to the first portable terminal. In operation 713, the first portable terminal transmits an association response to the second portable terminal.

In operation 714, the first portable terminal and the second portable terminal perform authentication of each other through a 4-way handshake process. More specifically, the second portable terminal, along with the first portable terminal, performs the 4-way handshake process by using a security key included in the connection information so that the second portable terminal acquires encryption keys such as a pair-wise transient key (PTK), a group temporal key (GTK), etc. necessary for security communication over the WLAN.

If operation 714 is completely performed, the process of establishing the WLAN link between the first portable terminal and the second portable terminal is complete.

In operation 715, the second portable terminal executes an application designating an application identifier of the connection information. In a case where a connection application that is being executed in the first portable terminal is an application providing a chatting service, the connection information may indicate the same application as the application providing the chatting service. As described above, in a case where a portable terminal supporting a function of establishing the WLAN link receives the connection information including the application identifier according to the present embodiment, the second portable terminal executes the corresponding application. Thus, in this case, the second portable terminal executes the same application as the chatting application that is being executed in the first portable terminal by referring to the application identifier included in the connection information, and thus the users A and B may enjoy the changing service over the WLAN.

The application identifier included in the connection information may also designate an application different from the connection application. For example, although the user A initiates connection to the user B through the chatting application, in a case where the user A attempts to streaming transmit a music file over the WLAN, the connection application may designate an application for reproducing the music file. These scenarios will be described in more detail below.

Figure 8A:
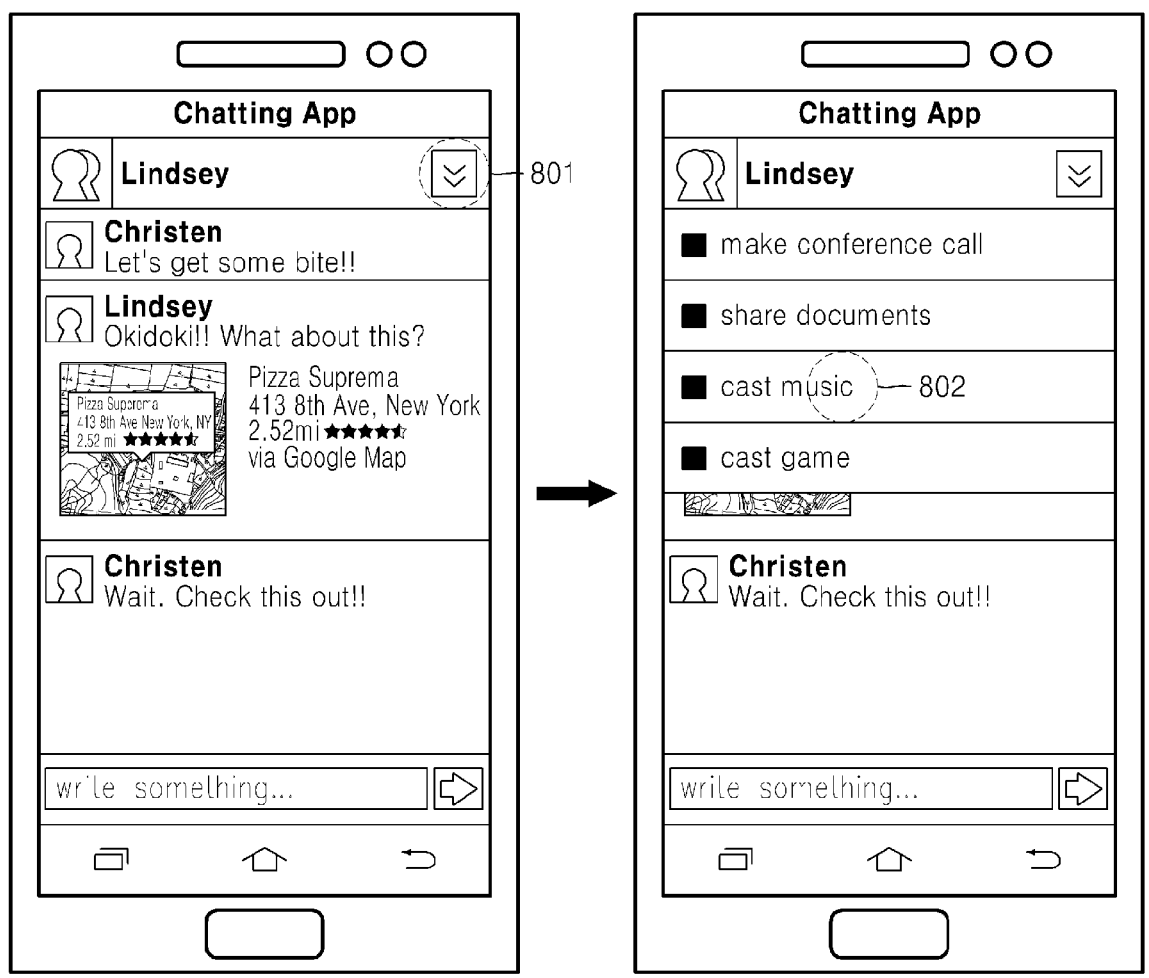
FIGS. 8A and 8B illustrate screens of portable terminals, according to an exemplary embodiment.
Figure 8B:
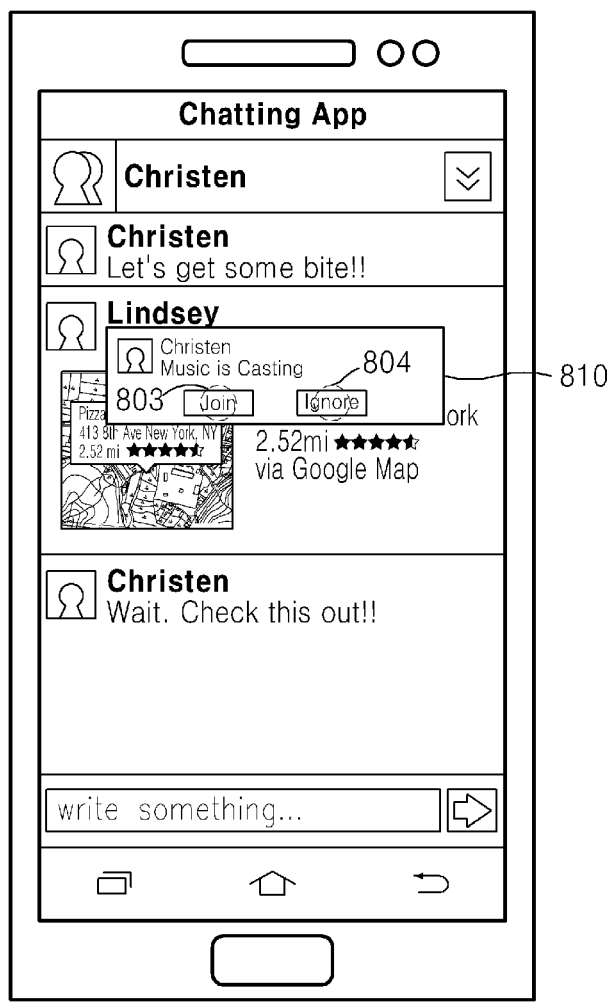

FIGS. 8A and 8B illustrate screens of portable terminals, according to an exemplary embodiment of.

Referring to FIG. 8A, Christen is talking to Lindsey through a chatting application. The chatting application may operate as a connection application according to the present embodiment. Thus, a button for performing a WLAN connection according to the present embodiment is displayed on a chatting screen. If Christen touches the button (801), sub menus asking an operation to do through the WLAN connection are displayed on the chatting screen.

Since Christen wants Lindsey to listen to MP3 music stored in her portable terminal, she touches <cast music> on the sub menus (802). In this regard, Christen's portable terminal generates connection information and transmits the connection information to an external server providing a service through the chatting application. The external server pushes the connection information to Lindsey's portable terminal. As described above, the portable terminals and the external server communicate with each other over a cellular network.

A selection menu as shown in FIG. 8B is displayed on a screen of the Lindsey's portable terminal that receives a push message from the external server. In this regard, if Lindsey touches <Join> (803), Lindsey's portable terminal establishes a WLAN link to Christen's portable terminal. If a WLAN function provided by Lindsey's portable terminal is idle, Lindsey's portable terminal establishes the WLAN link to Christen's portable terminal by activating the WLAN function. If the WLAN link is established, Lindsey's portable terminal executes an application for reproducing an MP3 file to reproduce the MP3 file that is streaming transmitted from Christen's portable terminal. If Lindsey touches <Ignore> (804), Lindsey's portable terminal is restored to a previous screen, i.e. the chatting window.

Although Christen is streaming the MP3 file to a person (Lindsey) to which she is talking through the chatting application that is the connection application in the present embodiment, she may select other persons to which she is not talking through the connection application from a contact list to establish WLAN links to the selected persons and stream MP3 files to them.

Meanwhile, if the WLAN link is established, Christen's portable terminal is able to stream the MP3 file to Lindsey's portable terminal over a WLAN, and thus both portable terminals no longer need to use a mobile communication network interface so as to communicate data therebetween. Thus, Christen's portable terminal and Lindsey's portable terminal are able to deactivate communication functions over a mobile communication network after establishing the WLAN link therebetween.

Figure 9A:
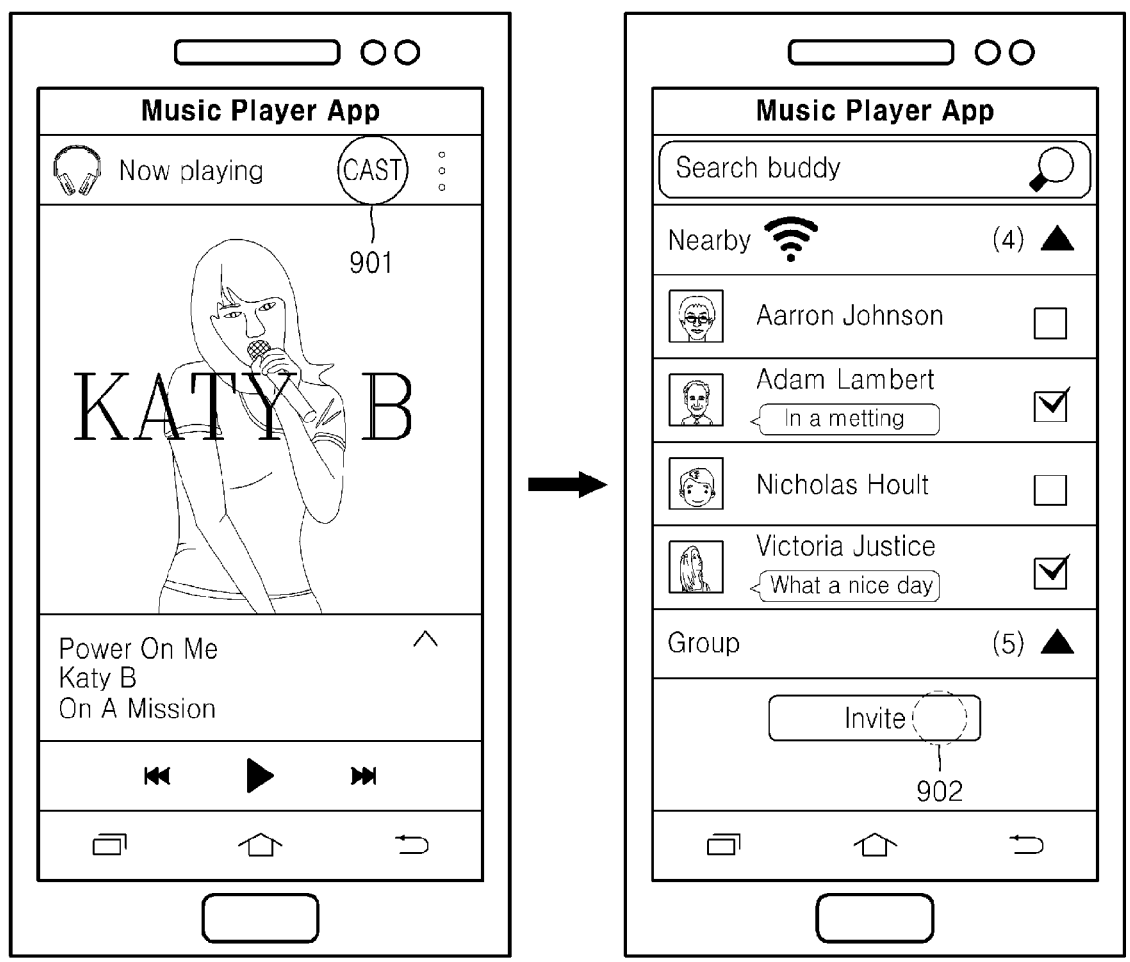
FIGS. 9A and 9B illustrate screens of portable terminals, according to another exemplary embodiment.
Figure 9B:
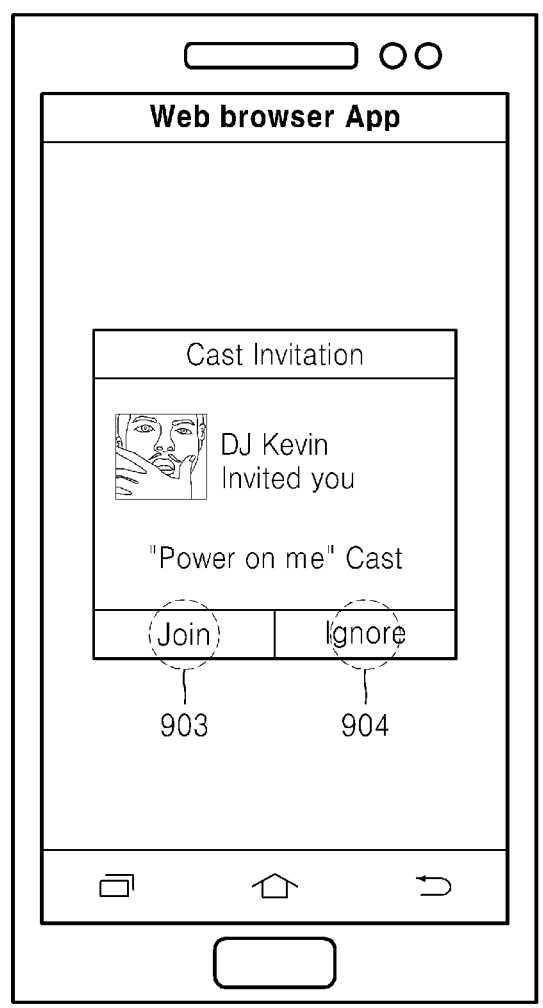

FIGS. 9A and 9B illustrate screens of portable terminals, according to another exemplary embodiment of.

Referring to FIG. 9A, Kevin is listening to music by using a music player application installed in his portable terminal. In this regard, the music player application may perform a function of a connection application according to the present embodiment. A button <Cast> for establishing WLAN links between Kevin's portable terminal and other portable terminals of a contact list is displayed on a screen of the music player application. Although the button is shown in FIG. 9A, an icon or a text menu may be displayed on the screen according to how to implement.

If Kevin touches the button <Cast> to share a music file that is being reproduced with his friends while listening to music, the contact list is displayed on the screen as shown in the right screen of FIG. 9A. Kevin selects Adam and Victoria from the contact list and touches a button <Invite> so as to streaming transmit the music file to their portable terminals over a WLAN (902). The button <Invite> of FIG. 9A may not be displayed on the screen according to the connection application (for example, a chatting application or an SNS application). Although the connection application (the music player application) displays the button <Invite> in FIG. 9A, the connection application (the chatting application) may not display the button <Invite> in FIG. 8A. According to Kevin's input, the music player application generates connection information, transfers the connection information to an external server over a cellular network. The external server transmits a push message including the connection information to Adam's and Victoria's portable terminals over the cellular network.

Meanwhile, Adam is web surfing by using a Web browser application of his portable terminal. His portable terminal receives the push message from the external server, and displays a selection menu asking whether to establish a WLAN link so as to reproduce streaming music of Kevin as shown in FIG. 9B. If Adam touches <Join> on the selection menu (903), his portable terminal establishes the WLAN link to Kevin's portable terminal by using the connection information. In this regard, if a WLAN function provided by the Adam's portable terminal is idle, his portable terminal establishes the WLAN link after activating the WLAN function.

If Adam selects <Ignore> on the selection menu, his portable terminal is restored to a previous Web browser screen.

Meanwhile, if the WLAN link is established, Kevin's portable terminal is able to stream music to Adam's portable terminal over the WLAN, and thus both portable terminals no longer need to use a mobile communication network interface so as to communicate data therebetween. Thus, Kevin's portable terminal and Adam's portable terminal are able to deactivate communication functions over a mobile communication network after establishing the WLAN link therebetween.

Figure 10:
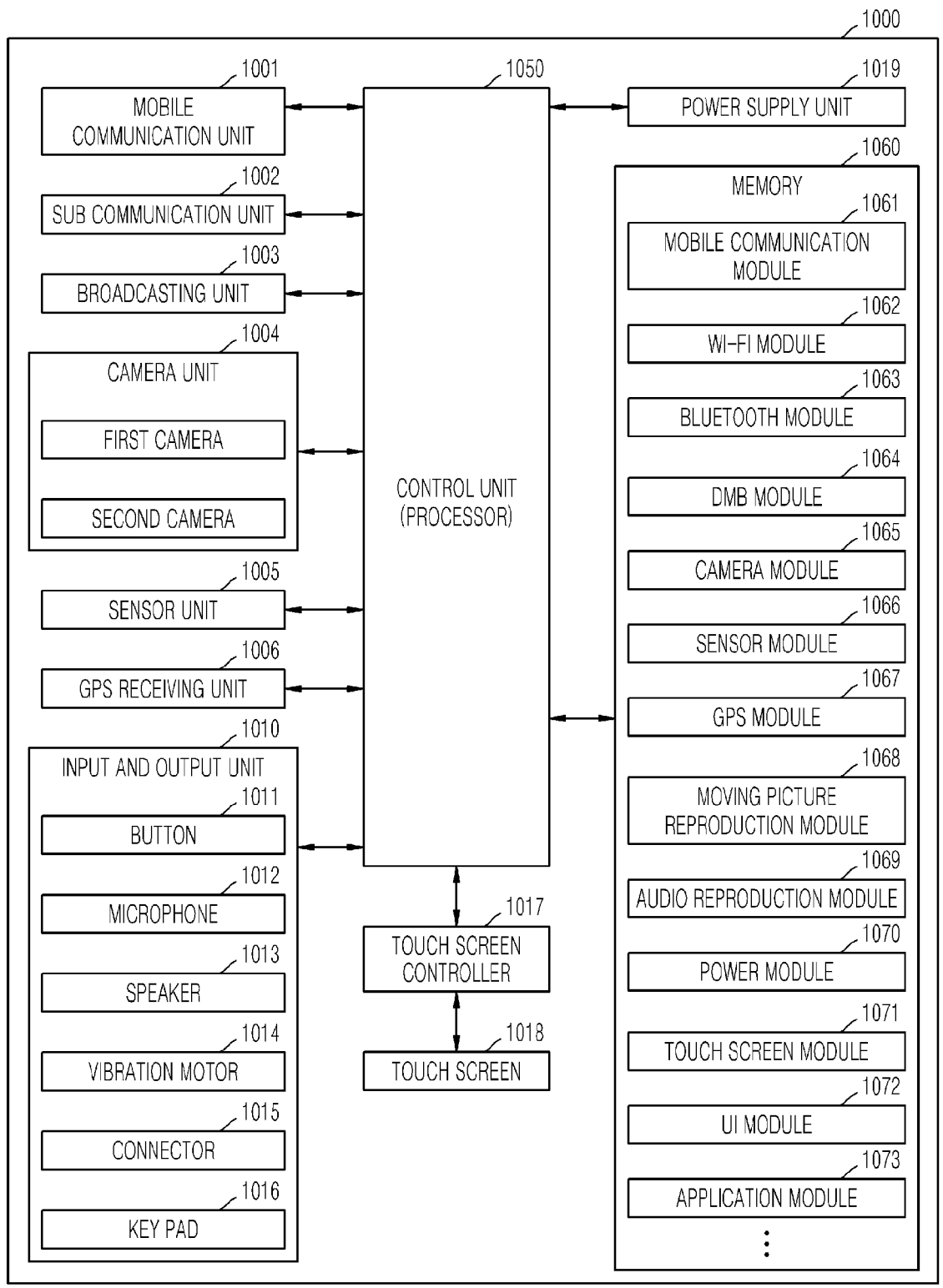
FIG. 10 is a block diagram of a portable terminal for setting a WLAN link, according to an exemplary embodiment.

FIG. 10 is a block diagram of a portable terminal 1000 for setting a WLAN link, according to an exemplary embodiment of.

Referring to FIG. 10, a mobile communication unit 1001 performs call setting, data communication, etc. with a base station over a cellular network such as 3 G/4 G. A sub communication unit 1002 performs a function for near distance communication such as Bluetooth or near field communication (NFC), etc. A broadcasting unit 1003 receives a digital multimedia broadcasting (DMB) signal.

A camera unit 1004 includes lenses and optical devices for photographing pictures or moving pictures.

A sensor unit 1005 may include a gravity sensor that senses a motion of a multi vision controller, an illumination sensor that senses brightness of light, a proximity sensor that senses proximity of a person, a motion sensor that senses a motion of a person, etc.

A global positioning system (GPS) receiving unit 1006 receives a GPS signal from a satellite. The GPS signal may be used to provide users with a variety of services.

An input and output unit 1010 provides an interface with an external device or a person, and includes a button 1011, a microphone 1012, a speaker 1013, a vibration motor 1014, a connector 1015, and a key pad 1016.

A touch screen 1018 receives a user's touch input. In this regard, the touch input may be a drag gesture or a tap gesture. A touch screen controller 1017 transfers the touch input received from the touch screen 1018 to a control unit 1050. A power supply unit 1019 is connected to a battery or an external power source to supply power necessary for the multi vision controller.

The control unit 1050 executes programs stored in a memory 1060, and thus a WLAN link is established according to an exemplary embodiment.

The programs stored in the memory 1060 may be classified as a plurality of modules according to functions thereof, such as a mobile communication module 1061, a Wi-Fi module 1063, a Bluetooth module 1063, a DMB module 1064, a camera module 1065, a sensor module 1066, a GPS module 1067, a moving picture reproduction module 1068, an audio reproduction module 1069, a power module 1070, a touch screen module 1071, a user interface (UI) module 1072, an application module 1073, and the like.

Functions of the respective modules can be intuitively expected by one of ordinary skill in the art from titles thereof, and thus the application module 1073 only will now be described. The application module 1073 may allow the portable terminal 1000 to serve as the first portable terminal of FIG. 3, i.e. a portable terminal that initiates a process of establishing the WLAN link according to an exemplary embodiment or as the second portable terminal of FIG. 5, i.e. a portable terminal that receives a push message including connection information from an external server over a cellular network.

A case where the portable terminal 1000 serves as the first portable terminal of FIG. 3 will now be described. If a user executes a connection application, the application module 1073 receives contact information relating to the portable terminal 1000 from a contact server over the cellular network in connection with the mobile communication module 1061, and displays a contact list on a screen. If the user selects at least one contact from the contact list through the touch screen 1018, the application module 1073 starts an AP function in connection with the mobile communication module 1061, and generates connection information. The application module 1073 transmits the connection information to the external server over the cellular network in connection with the mobile communication module 1061. As described above, in this regard, the connection information includes an SSID of a WLAN, a channel number, a security key, mode information, an application identifier, etc. The application identifier may designate a connection application or other application.

As described above, the connection information is transferred to a push server over the cellular network, and is finally pushed to a second portable terminal selected by the user. If a correspondent portable terminal that acquired the connection information requests a connection over the WLAN, the application module 1073 establishes the WLAN link to the correspondent portable terminal in connection with the Wi-Fi module 1062.

Then, a case where the portable terminal 1000 serves as the second portable terminal of FIG. 5 will now be described. If a push message including connection information is received through the mobile communication unit 1001, the application module 1073 displays a selection menu asking whether to set the WLAN link to the first portable terminal on a screen. If the user touches a connection authentication button through the touch screen 1018, the application module 1073 establishes the WLAN link to the first portable terminal in connection with the Wi-Fi module 1062.

The embodiments described herein can be written as computer programs and can be implemented in general-use digital computers that execute the programs using a computer readable recording medium.

Examples of the computer readable recording medium include magnetic storage media (e.g., ROM, floppy disks, hard disks, etc.), storage media such as optical recording media (e.g., CD-ROMs, or DVDs).

While exemplary embodiments have been particularly shown and described, it will be understood by those of ordinary skill in the art that various changes in form and details may be made therein without departing from the spirit and scope of the inventive concept as defined by the following claims.

What is claimed is:

1. A method for a first portable terminal to communicate with a second portable terminal, the method comprising:
    displaying a contact list on a screen of the first portable terminal;
    the first portable terminal receiving a user input indicating a selection of at least one contact from the contact list;
    the first portable terminal transmitting, over a mobile communication network to the second portable terminal, connection information necessary for the second portable terminal to establish a wireless local area network (WLAN) link with the first portable terminal;
    the first portable terminal receiving a WLAN connection request from the second portable terminal through a WLAN interface; and the first portable terminal establishing the WLAN link to the second portable terminal in response to the connection request;
  wherein a mode of the WLAN link is determined based on a type of an executed application.

2. The method of claim 1, wherein the connection information comprises a service set identifier of the WLAN, a channel number, and a security key.

3. The method of claim 1, further comprising: determining mode information corresponding to one of an ad hoc mode and an infrastructure mode,
  wherein the connection information comprises the determined mode information.

4. The method of claim 3, wherein the establishing of the WLAN link comprises: establishing the WLAN link according to the mode information; and
  wherein, if the mode information is the infrastructure mode, the first portable terminal serves as an access point (AP), and the second portable terminal serves as a non-AP station.

5. The method of claim 1, further comprising: executing an application that displays the contact list,
  wherein the connection information comprises an identifier of an application corresponding to the executed application.

6. The method of claim 5, wherein the identifier of the application corresponds to an application of the second portable terminal capable of executing contents transmitted by the first portable terminal.

7. The method of claim 1, further comprising: transmitting contents from the first portable terminal to the second portable terminal by using the established WLAN link.

8. The method of claim 1, wherein the transmitting the connection information comprises: transferring the connection information to the second portable terminal over an external server according to a push mechanism.

9. A method for a second portable terminal to communicate with a first portable terminal, the method comprising:
  the second portable terminal receiving, in a push mechanism from an external server, connection information necessary for the second portable terminal to communicate with the first portable terminal over a wireless local area network (WLAN);
  displaying a selection menu for establishing a WLAN link to the first portable terminal on a screen of the second portable terminal;
  the second portable terminal receiving, through the displayed selection menu, an input indicating a request for a connection to the first portable terminal; and
  in response to the input, establishing the WLAN link to the first portable terminal through a WLAN interface by using the connection information;
  wherein a mode of the WLAN link is determined based on a type of an executed application.

10. The method of claim 9, wherein the connection information comprises a service set identifier SSID of the WLAN, a channel number, and a security key.

11. The method of claim 9, wherein the connection information comprises mode information corresponding to one of an ad hoc mode and an infrastructure mode,
  wherein the establishing the WLAN link is performed based on the mode information.

12. The method of claim 11, wherein, if the mode information is the infrastructure mode, the first portable terminal serves as an access point (AP), and the second portable terminal serves as a non-AP station.

13. The method of claim 9, further comprising: executing an application corresponding to an identifier of an application included in the connection information.

14. The method of claim 9, wherein the establishing the WLAN link comprises: if a WLAN function of the second portable terminal is idle, activating the WLAN function.

15. A non-transitory computer readable recording medium having recorded thereon a program for executing a method for a first portable terminal to communicate with a second portable terminal, the method comprising:
  displaying a contact list on a screen of the first portable terminal;
  the first portable terminal receiving a user input indicating a selection of at least one contact from the contact list;
  the first portable terminal transmitting, over a mobile communication network to the second portable terminal, connection information necessary for the second portable terminal to establish a wireless local area network (WLAN) link with the first portable terminal;
  the first portable terminal receiving a WLAN connection request from the second portable terminal through a WLAN interface; and
  the first portable terminal establishing the WLAN link to the second portable terminal in response to the connection request;
  wherein a mode of the WLAN link is determined based on a type of an executed application.

16. A portable terminal device comprising:
  a memory which stores at least one program; and
  a processor which executes the at least one program in such a way that a first portable terminal and a second portable terminal establish a WLAN link therebetween,
  wherein the at least one program comprises instructions for:
    displaying a contact list on a screen of the first portable terminal;
    the first portable terminal receiving a user input indicating a selection of at least one contact from the contact list;
    the first portable terminal transmitting, over a mobile communication network to the second portable terminal, connection information necessary for the second portable terminal to establish a wireless local area network (WLAN) link with the first portable terminal;
    the first portable terminal receiving a WLAN connection request from the second portable terminal through a WLAN interface; and
    the first portable terminal establishing the WLAN link to the second portable terminal in response to the connection request;
    wherein a mode of the WLAN link is determined based on a type of an executed application.

17. The portable terminal device of claim 16, wherein the connection information comprises service set identifier of the WLAN, a channel number, and a security key.

18. The portable terminal device of claim 16, wherein the at least one program further comprises: instructions for determining mode information corresponding to one of an ad hoc mode and an infrastructure mode,
  wherein the connection information comprises the determined mode information.

19. The portable terminal device of claim 18, wherein the establishing of WLAN link comprises: establishing the WLAN link according to the mode information; and wherein, if the mode information is the infrastructure mode, the first portable terminal serves as an access point (AP), and the second portable terminal serves as a non-AP station.

20. The portable terminal device of claim 16, wherein the at least one program further comprises: instructions for executing an application that displays the contact list,
   wherein the connection information comprises an identifier of an application corresponding to the executed application.

21. The portable terminal device of claim 20, wherein the identifier of the application corresponds to an application of the second portable terminal capable of executing contents transmitted by the first portable terminal.

22. A portable terminal device comprising:
   a memory which stores at least one program; and
   a processor which executes the at least one program in such a way that the portable terminal, which is a first portable terminal, and a second portable terminal establish a WLAN link therebetween,
   wherein the at least one program comprises instructions for:
      the portable terminal device receiving, in a push mechanism from an external server, connection information necessary for the portable terminal device to communicate with another portable terminal device over a wireless local area network (WLAN);
      displaying a selection menu for establishing a WLAN link to the another portable terminal device on a screen of the portable terminal device;
      the portable terminal receiving, through the displayed selection menu, an input indicating a request for a connection to the another portable terminal device; and
      in response to the input, establishing the WLAN link to the another portable terminal device through a WLAN interface by using the connection information;
   wherein a mode of the WLAN link is determined based on a type of an executed execution.

23. The portable terminal device of claim 22, wherein the connection information comprises mode information corresponding to one of an ad hoc mode and an infrastructure mode,
   wherein the establishing the WLAN link is performed based on the mode information.

24. The portable terminal device of claim 23, wherein, if the mode information is the infrastructure mode, the another portable terminal device serves as an access point (AP), and the portable terminal device serves as a non-AP station.

25. The portable terminal device of claim 22, wherein the at least one program further comprises: instructions for executing an application corresponding to an identifier of an application included in the connection information.

26. The portable terminal device of claim 22, wherein the at least one program further comprises: instructions for, if a WLAN function of the portable terminal device is idle, activating the WLAN function.

27. A method for a server to communicate with a plurality of portable terminals over a mobile communication network, the method comprising:
   the server transmitting, to a first portable terminal, contact information registered in connection with the first portable terminal;
   the server receiving, from the first portable terminal, at least one contact selected from the contact information and connection information necessary for establishing a wireless local area network (WLAN) link to the first portable terminal; and
   the server transmitting the connection information to a second portable terminal corresponding to the selected at least one contact according to a push mechanism;
wherein a mode of the WLAN link is determined based on a type of an executed application.

* * * * *